United States Patent
Vogel et al.

(10) Patent No.: US 8,931,830 B2
(45) Date of Patent: Jan. 13, 2015

(54) WIND DEFLECTOR FOR SLIDING ROOF SYSTEM

(71) Applicants: Stefan Vogel, Ortenberg (DE); Waldemar Schmidt, Wiesbaden (DE)

(72) Inventors: Stefan Vogel, Ortenberg (DE); Waldemar Schmidt, Wiesbaden (DE)

(73) Assignee: Roof Systems Germany GmbH (DE)

( * ) Notice: Subject to any disclaimer, the term of this patent is extended or adjusted under 35 U.S.C. 154(b) by 0 days.

(21) Appl. No.: 14/089,233

(22) Filed: Nov. 25, 2013

(65) Prior Publication Data

US 2014/0159435 A1      Jun. 12, 2014

(30) Foreign Application Priority Data

Dec. 7, 2012   (DE) .......................... 10 2012 111 915

(51) Int. Cl.
*B60J 7/22*   (2006.01)

(52) U.S. Cl.
CPC ........................................ *B60J 7/22* (2013.01)
USPC ......................................................... 296/217

(58) Field of Classification Search
CPC ......................................................... B60J 7/22
USPC ......................................................... 296/217
See application file for complete search history.

(56) References Cited

U.S. PATENT DOCUMENTS

| | | | | |
|---|---|---|---|---|
| 5,178,436 A * | 1/1993 | Eberius et al. | ................. | 296/217 |
| 5,431,477 A * | 7/1995 | Smith et al. | ................. | 296/217 |
| 6,695,399 B2 * | 2/2004 | Pfertner et al. | ................. | 296/217 |
| 6,877,800 B2 * | 4/2005 | Maeta et al. | ................. | 296/217 |
| 7,441,834 B2 * | 10/2008 | Eller et al. | ................. | 296/217 |
| 7,533,928 B2 * | 5/2009 | Biewer et al. | ................. | 296/217 |
| 7,866,741 B2 * | 1/2011 | Horiuchi et al. | ................. | 296/217 |
| 8,191,962 B2 * | 6/2012 | Katayama | ................. | 296/217 |
| 8,246,110 B2 * | 8/2012 | Katayama et al. | ................. | 296/217 |
| 2006/0163916 A1 | 7/2006 | Escher et al. | | |
| 2008/0067839 A1 | 3/2008 | Staltmayer | | |

FOREIGN PATENT DOCUMENTS

| | | |
|---|---|---|
| DE | 11 49 627 A | 5/1963 |
| DE | 30 39 769 A1 | 11/1982 |
| DE | 100 62 730 C1 | 6/2002 |
| DE | 103 48 381 A1 | 9/2004 |
| DE | 200410308042004 B3 | 1/2006 |

OTHER PUBLICATIONS

English Abstract for DE10062730.
English Translation of Abstract for DE 103 48 381.
English Translation of Claim 1 of DE 11 49 627 A.
Official Action issued by the German Patent Office in connection with the German counterpart application 10 2012 111 915.5 (dated Aug. 28, 2013).
English Translation of Official Action issued by the German Patent Office in connection with the German counterpart application 10 2012 111 915.5.

* cited by examiner

*Primary Examiner* — Dennis H Pedder
(74) *Attorney, Agent, or Firm* — Cantor Colburn LLP

(57) ABSTRACT

A wind deflector for a sliding roof system is disclosed herein, the wind deflector having: a wind deflector element that is adjustable between a lowered position and an extended position; and a pair of raising arms that are each connected with the wind deflector element at one end and with an abutment at the other end, wherein the abutment is vehicle-fixed, that the raising arms are configured to be telescopically length-adjustable, and that an adjustment mechanism is provided by which the distance of the wind deflector element from the abutments is reduced when it is moved from the lowered position to the extended position.

20 Claims, 5 Drawing Sheets

WIND DEFLECTOR FOR SLIDING ROOF SYSTEM

CROSS REFERENCE TO RELATED APPLICATIONS

This application claims priority under 35 U.S.C. §119 to the following Germany Patent Application No. DE 10 2012 111 915.5 filed Dec. 7, 2012, the contents of which are incorporated herein by reference thereto.

BACKGROUND

Various embodiments of the invention relate to a wind deflector for a sliding roof system, having a wind deflector element that is adjustable between a lowered position and an extended position, and a pair of raising arms that are each connected with the wind deflector element at one end and with an abutment at the other end.

A wind deflector is disclosed in DE 10 2004 030 804 B3 (See also U.S. Patent Publication No. 2008/0067839). The abutment is shiftably mounted to a guide rail of the sliding roof system, and a retraction means makes sure that the two raising arms are pulled back toward the rear along with the wind deflector when the latter is adjusted from the lowered position to the extended position. In this way, the wind deflector element is in a pulled-back position when it is in the extended position, so that the wind deflector proper, which here takes the form of a net which, proceeding from the roof of the vehicle, extends to the wind deflector element, is in a backwardly inclined position.

This wind deflector has the disadvantage that it requires much space in the longitudinal direction of the vehicle.

Accordingly, it is desirable to provide a wind deflector of the type mentioned above wherein a compact design is provided along with a high level of functional reliability.

SUMMARY OF THE INVENTION

In one embodiment, provision is made in a wind deflector of the type initially mentioned herein that the abutment is vehicle-fixed, that the raising arms are configured to be telescopically length-adjustable, and that an adjustment mechanism is provided by which the distance of the wind deflector element from the abutments is reduced when it is moved from the lowered position to the extended position. The invention is based on the fundamental idea of making use of the raising arms themselves for shifting the wind deflector element, so that the raising arms can be mounted to a vehicle-fixed and, hence, stable abutment. The adjusting movement can be controlled by the adjustment mechanism with little effort, so that in both positions, i.e. retracted and extended, the wind deflector element will be in the desired position (as viewed in the longitudinal direction of the vehicle).

In some embodiments, provision is made that the raising arm includes two sections that can be shifted in relation to each other. In this way, the desired adjustability of the raising arm can be ensured with little effort and high mechanical reliability.

According to an embodiment, provision is made that one section is provided with a guide slot and the other section is provided with a projection that engages in the guide slot. In this configuration, the length of the guide slot may be made use of for setting the maximum range of adjustment of the length of the raising arm with little effort.

According to an alternative embodiment of the invention, provision is made that one section is a leg of a raising spring which is in the form of a leg spring and is mounted to the abutment, the leg being received for shifting motion in the raising arm. In this configuration, a separate raising spring may be dispensed with.

In some embodiments, provision is made here that the leg of the raising spring is insert-molded with a plastic element which is received for shifting motion in the raising arm. The use of the plastic element results in a plastic/plastic friction pairing, which is advantageous in terms of friction conditions.

According to one embodiment of the invention, provision is made that the adjustment mechanism is a limiting lever which has one end swivel-mounted to the raising arm and another end swivel-mounted to a vehicle-fixed bearing. Such a limiting lever allows, with very little effort, the telescoping movement of the two sections of the raising arm to be controlled as a function of the angle of tilt of the wind deflector. At the same time, the limiting lever may be used for setting the maximum angle of tilt.

If, in the lowered position of the wind deflector, the vehicle-fixed bearing of the limiting lever is closer to the vehicle-fixed abutment than the connection between the raising arm and the limiting lever, the wind deflector element is automatically pulled back toward the rear when the wind deflector is adjusted from the lowered position to the extended position.

In some embodiments, provision is made that a net wind deflector is mounted to the wind deflector element. The net wind deflector has the advantage that it can be folded up in a very space-saving manner. Moreover, by an appropriate selection of the mesh size of the net it can be ensured that the desired flow conditions at the wind deflector are obtained.

In one embodiment, a wind deflector for a sliding roof system, is provided. The wind deflector having comprising: a wind deflector element that is adjustable between a lowered position and an extended position; and a pair of raising arms that are each connected with the wind deflector element at one end and with an abutment at the other end, wherein the abutment is vehicle-fixed, that the raising arms are configured to be telescopically length-adjustable, and that an adjustment mechanism is provided by which the distance of the wind deflector element from the abutments is reduced when it is moved from the lowered position to the extended position.

Advantageous further configurations of the invention will be apparent from the FIGS. and the detailed description to follow.

BRIEF DESCRIPTION OF THE DRAWINGS

The invention will now be described below by reference to embodiments which are illustrated in the accompanying drawings, in which.

DETAILED DESCRIPTION

Figure 1:
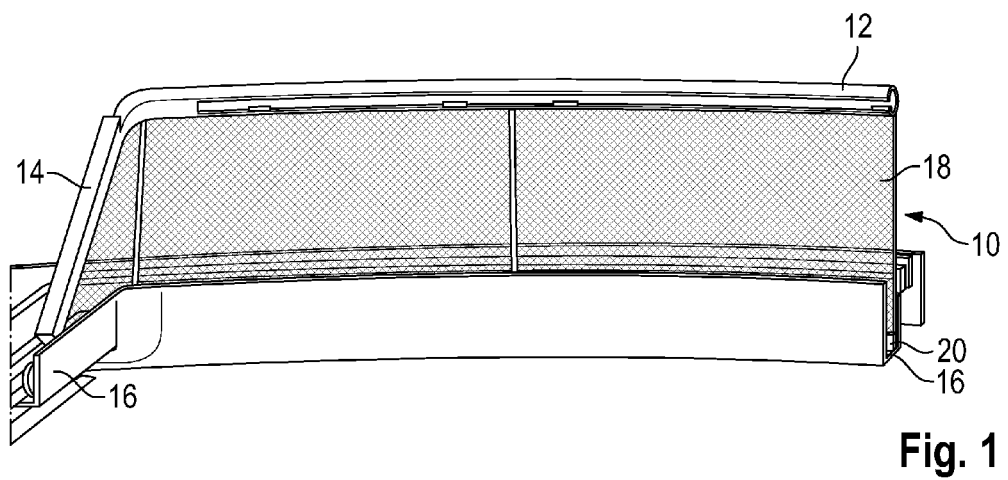
FIG. 1 schematically shows a wind deflector.
Figure 2:
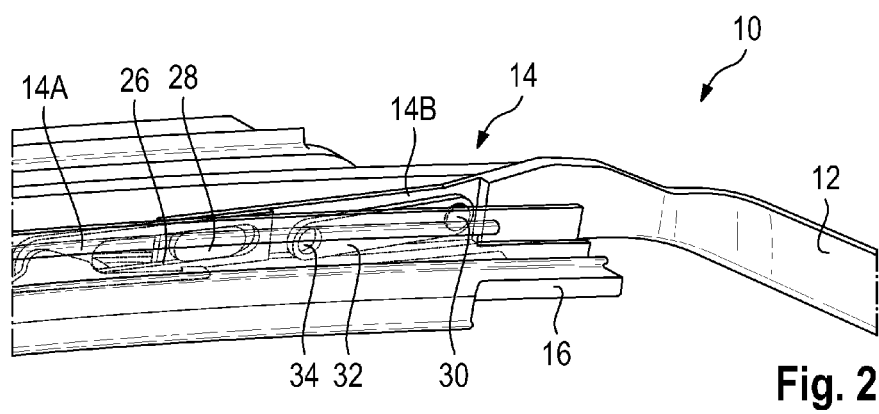
FIG. 2 shows a partial view of a wind deflector according to a first embodiment of the invention, with the wind deflector element being in a lowered position.
Figure 3:
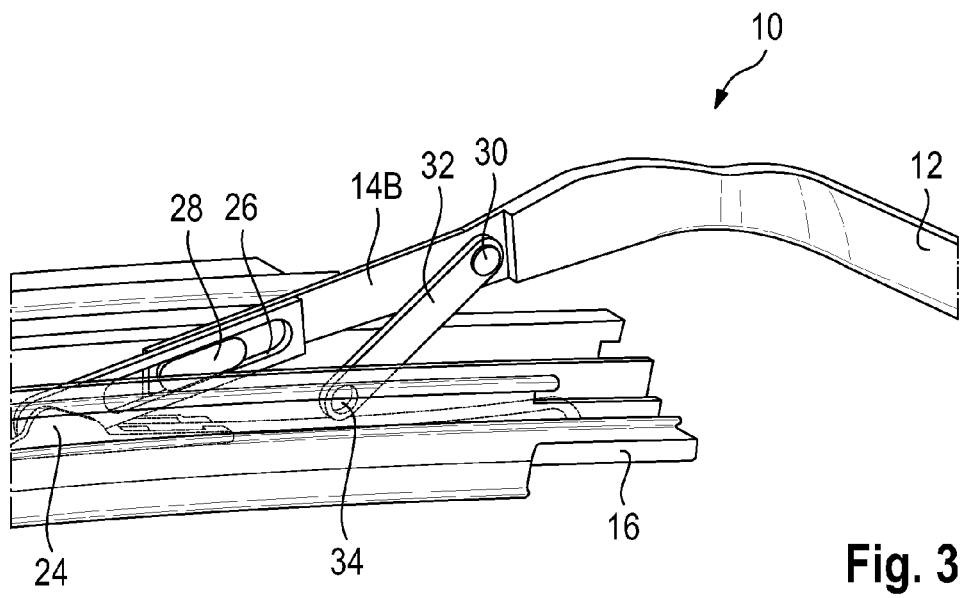
FIG. 3 shows the wind deflector of FIG. 2, with the wind deflector element being in a partially extended position.
Figure 4:
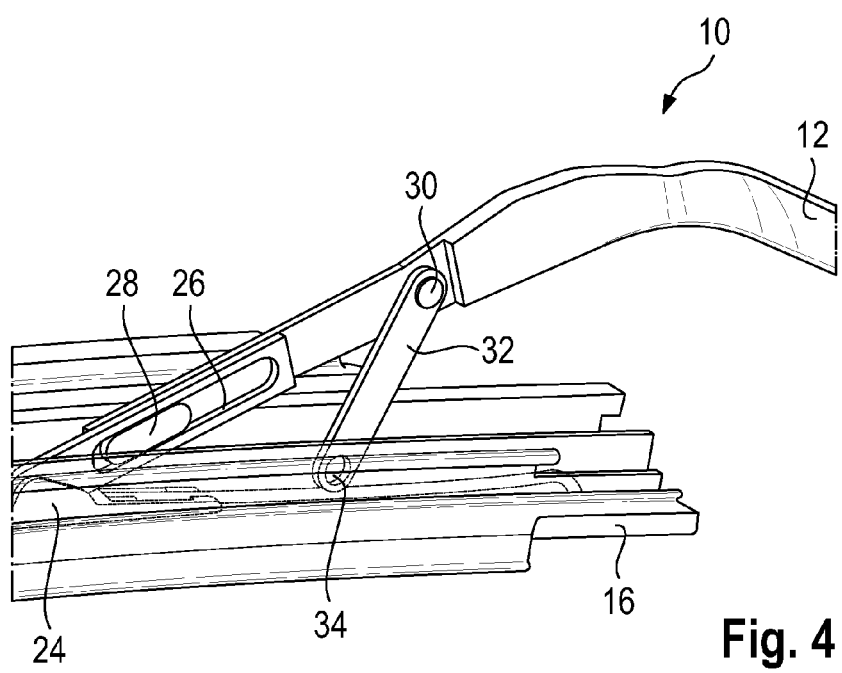
FIG. 4 shows the wind deflector of FIG. 2, with the wind deflector element being in a fully extended position.

FIG. 1 generally shows a wind deflector 10. It includes a wind deflector element 12 which is positioned transversely to the longitudinal axis of a motor vehicle, in the area of the front edge of a roof opening which has a sliding roof cover (not shown here) associated with it. By means of a pair of raising arms 14, only one of which is shown here, the wind deflector element is mounted to the vehicle, in particular to a guide rail 16, for swiveling motion between a lowered position and an extended position. Connected with the wind deflector element 12 is a net wind deflector 18 which extends from the wind deflector element 12 downward to the guide rail 16, where the net wind deflector 18 is received in an attachment section 20.

FIGS. 2 to 5 show a wind deflector according to a first embodiment of the invention. The same reference numbers are used for the components known from FIG. 1, and reference is made to the above explanations in this respect.

For mounting the two raising arms 14 of the wind deflector 10, provision is made for an abutment 24 that is mounted in a vehicle-fixed manner, in particular mounted firmly to the guide rail 16. The raising arm 14 is formed of two sections here, which are designed to be telescoped into each other and extended again, so that the distance from the wind deflector element 12 to the abutment 24 can be varied. In the first embodiment, each raising arm 14 consists of a first section 14A and a second section 14B, which can be shifted relative to each other. The first section 14A is mounted to the abutment 24 for swiveling motion and includes a guide slot 26. The second section 14B of the raising arm 14 engages in the guide slot, more specifically by means of a projection 28. The projection 28 here is made in one piece with the second section 14B of the raising arm 14, which, in turn, is made in one piece with the wind deflector element 12.

A limiting lever 32 is swivel-mounted to the second section 14B of the raising arm 14 in a joint 30, the other end of the limiting lever 32 being swivel-mounted at a vehicle-fixed bearing 34, in particular at the guide rail 16.

In the lowered position of the wind deflector element, the projection 28 is located at the front end of the guide slot 26, as viewed in the longitudinal direction of the vehicle. The limiting lever 32 is substantially parallel to the raising arm 14, the swivel bearing 30 being located in front of the vehicle-fixed bearing 34.

When the wind deflector 10 is raised, the limiting lever 32 pulls the second section 14B of the raising lever 14 backward since the swivel bearing 30 swivels through a shorter radius than the raising lever 14. In the fully raised position of the wind deflector element 12 (see FIGS. 4 and 5), the projection 28 is located at or near the rear end of the guide slot 26. The overall length of the raising arm 14 has thereby decreased by the displacement path of the projection 28 within the guide slot 26. In other words, the wind deflector element 12 has traveled toward the rear, as viewed along the longitudinal direction of the vehicle.

The limiting lever 32 together with the dimensioning of the guide slot 26 may basically be used for limiting the maximum raising range of the wind deflector element 12. In practice, however, it will be preferred to limit the maximum raising range by the net wind deflector 18 fixed to the wind deflector element 12, for the net wind deflector 18 to be taut in the maximum raised position.

Figure 5:
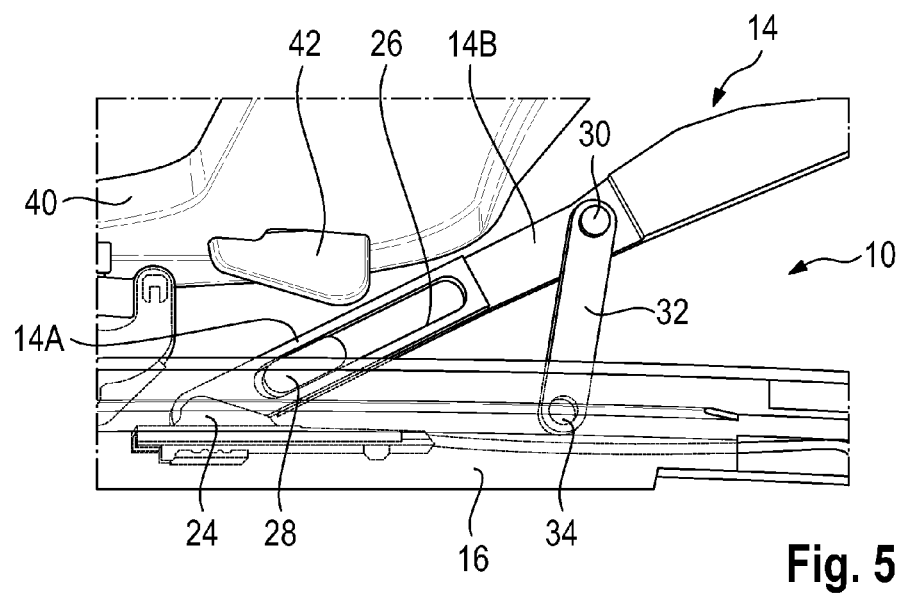
FIG. 5 shows the wind deflector of FIG. 4, with a sliding roof cover being shown additionally.

As shown in FIG. 5, closing (and opening as well) of the wind deflector is controlled by the movement of a sliding roof cover 40 which directly engages the two raising arms 14 by means of a projection 42. A raising spring permanently urging the wind deflector to the raised position is not illustrated in the FIGS. for the sake of greater clarity.

Figure 6:
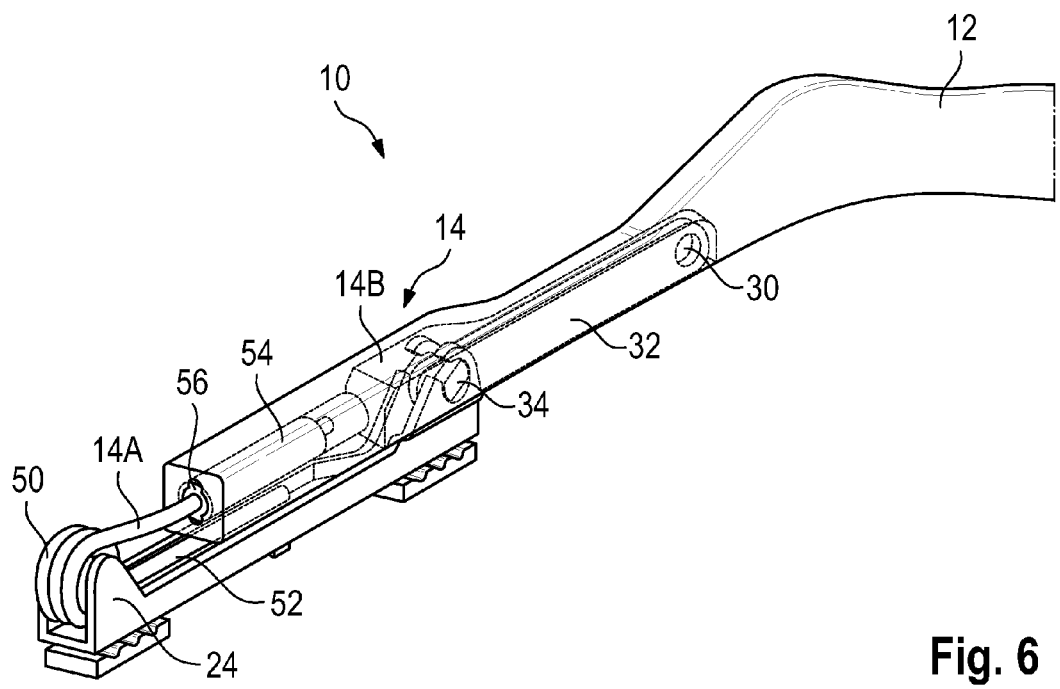
FIG. 6 shows, in a cutaway view, a wind deflector according to a second embodiment, with the wind deflector element being in a lowered position.
Figure 7:
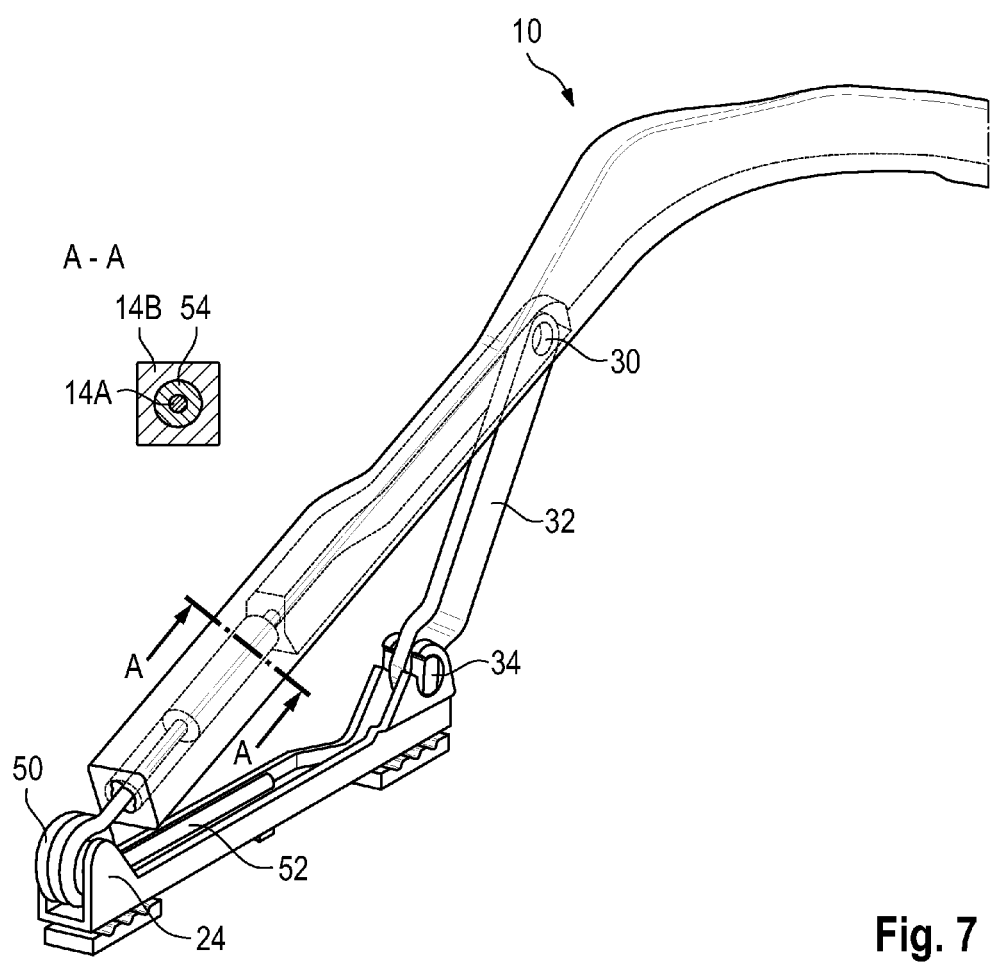
FIG. 7 shows the wind deflector of FIG. 6, with the wind deflector element being in a raised position.

FIGS. 6 and 7 show a wind deflector 10 according to a second embodiment of the invention. The same reference numbers are used for the components known from the first embodiment, and reference is made to the above explanations in this respect.

The difference between the first and second embodiments consists in that in the second embodiment the first section 14A of the raising arm 14 is formed by a leg of a leg spring 50, the second leg 52 of which is supported in a vehicle-fixed manner. The leg spring 50 acts as a raising spring for the wind deflector and urges the raising lever 14 permanently upward.

That leg of the leg spring 50 that forms the first section 14A of the raising lever 14 has a plastic element 54 injection-molded around it which is received for being shifted inside a guide 56 in the second section 14B of the raising arm 14.

In the lowered position of the wind deflector element, the free end of the second section 14B is positioned at a certain distance from the vehicle-fixed abutment 24. In the raised position, the free end of the second section 14B of the raising arm has moved closer to the abutment 24, as can be seen by a comparison of FIGS. 6 and 7. In the process, the plastic element 54 has been pushed more deeply into the guide 56 in the second section 14B of the raising arm 14.

Figure 8:
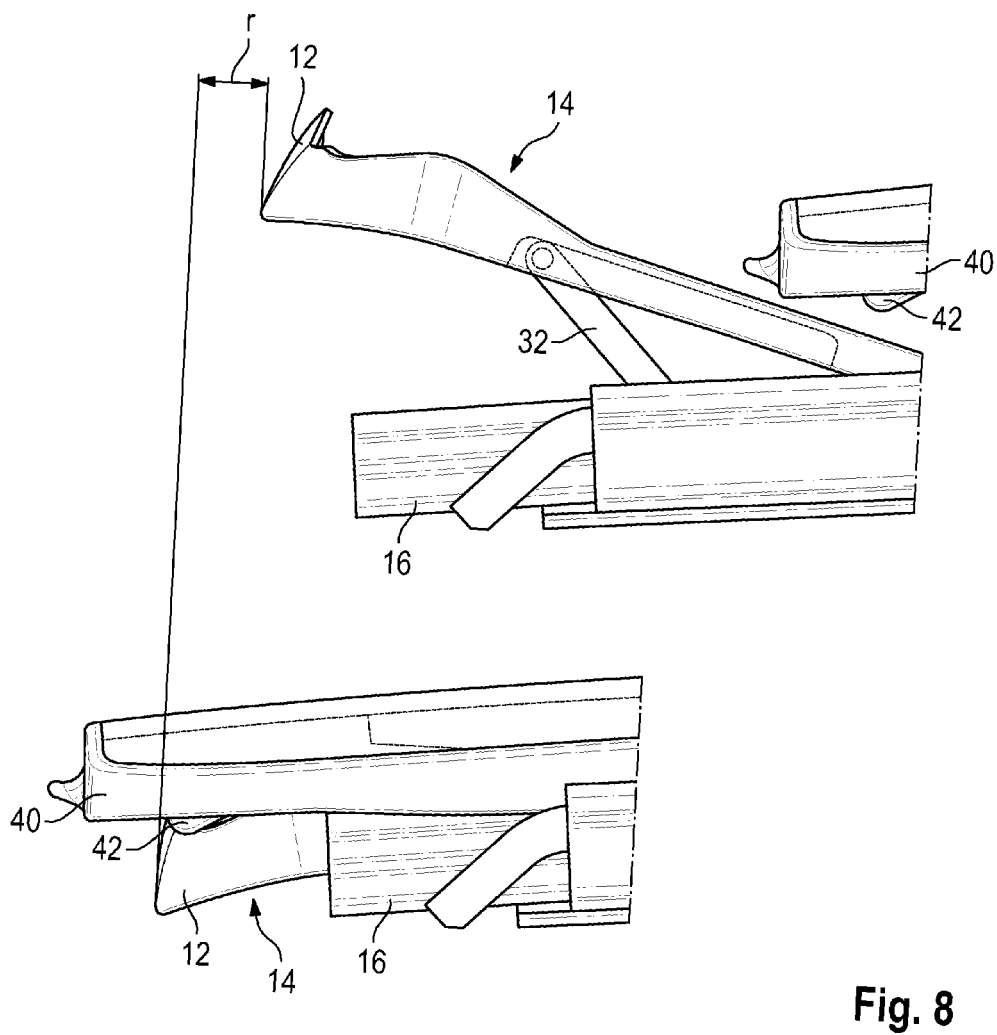
FIG. 8 shows, in a side view, a comparison of the positions of the wind deflector element, as viewed along the longitudinal direction of the vehicle, in the lowered position and in the extended position.

As can be seen in FIG. 8, when the wind deflector element 12 is adjusted from the lowered position to the extended position, it is pulled toward the rear by a distance r. This distance can be set by the length of the limiting lever 32 as desired. In practice, values on the order of 30 mm are advantageous.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. A wind deflector for a sliding roof system, comprising:
a wind deflector element that is adjustable between a lowered position and an extended position; and
a pair of raising arms that are each connected with the wind deflector element at one end and with an abutment at the other end, wherein the abutment is vehicle-fixed, that the raising arms are configured to be telescopically length-adjustable, and that an adjustment mechanism is provided by which the distance of the wind deflector element from the abutments is reduced when it is moved from the lowered position to the extended position.

2. The wind deflector according to claim 1, wherein the raising arm includes two sections that can be shifted in relation to each other.

3. The wind deflector according to claim 2, wherein one section is provided with a guide slot and the other section is provided with a projection that engages in the guide slot.

4. The wind deflector according to claim 2, wherein one section is a leg of a raising spring which is in the form of a leg spring and is mounted to the abutment, the leg being received for shifting motion in the raising arm.

5. The wind deflector according to claim 4, wherein the leg of the raising spring is insert-molded with a plastic element which is received for shifting motion in the raising arm.

6. The wind deflector according to claim 5, wherein the adjustment mechanism is a limiting lever which has one end swivel-mounted to the raising arm and another end swivel-mounted to a vehicle-fixed bearing.

7. The wind deflector according to claim 6, wherein in the lowered position, the vehicle-fixed bearing is closer to the vehicle-fixed abutment than the connection between the raising arm and the limiting lever.

8. The wind deflector according to claim 4, wherein the adjustment mechanism is a limiting lever which has one end swivel-mounted to the raising arm and another end swivel-mounted to a vehicle-fixed bearing.

9. The wind deflector according to claim 8, wherein in the lowered position, the vehicle-fixed bearing is closer to the vehicle-fixed abutment than the connection between the raising arm and the limiting lever.

10. The wind deflector according to claim 3, wherein the adjustment mechanism is a limiting lever which has one end swivel-mounted to the raising arm and another end swivel-mounted to a vehicle-fixed bearing.

11. The wind deflector according to claim 10, wherein in the lowered position, the vehicle-fixed bearing is closer to the vehicle-fixed abutment than the connection between the raising arm and the limiting lever.

12. The wind deflector according to claim 2, wherein the adjustment mechanism is a limiting lever which has one end swivel-mounted to the raising arm and another end swivel-mounted to a vehicle-fixed bearing.

13. The wind deflector according to claim 12, wherein in the lowered position, the vehicle-fixed bearing is closer to the vehicle-fixed abutment than the connection between the raising arm and the limiting lever.

14. The wind deflector according to claim 1, wherein the adjustment mechanism is a limiting lever which has one end swivel-mounted to the raising arm and another end swivel-mounted to a vehicle-fixed bearing.

15. The wind deflector according to claim 14, wherein in the lowered position, the vehicle-fixed bearing is closer to the vehicle-fixed abutment than the connection between the raising arm and the limiting lever.

16. The wind deflector according to claim 1, wherein a net wind deflector is mounted to the wind deflector element.

17. The wind deflector according to claim 3, wherein a net wind deflector is mounted to the wind deflector element.

18. The wind deflector according to claim 7, wherein a net wind deflector is mounted to the wind deflector element.

19. The wind deflector according to claim 9, wherein a net wind deflector is mounted to the wind deflector element.

20. The wind deflector according to claim 14, wherein a net wind deflector is mounted to the wind deflector element.

* * * * *